No. 646,029. Patented Mar. 27, 1900.
M. LONG.
SOFT TREAD HORSESHOE.
(Application filed Dec. 23, 1899.)
(No Model.)
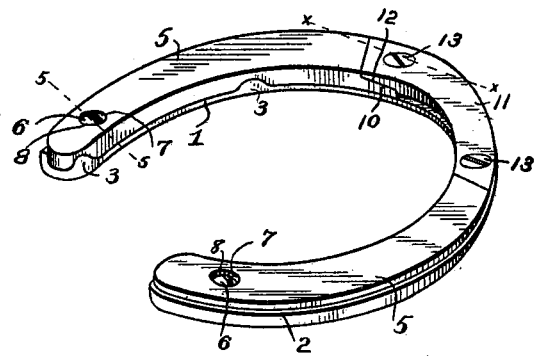
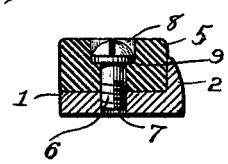
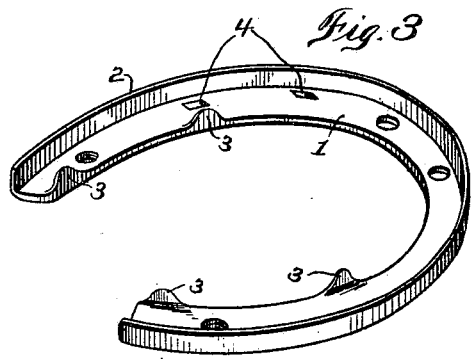
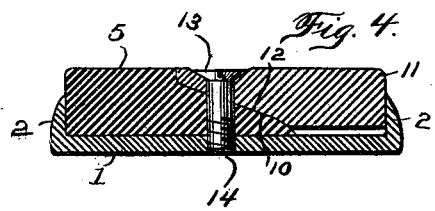
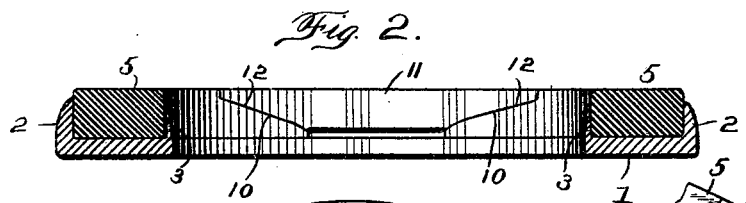
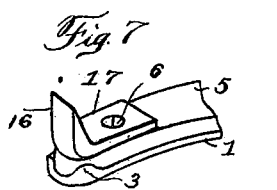
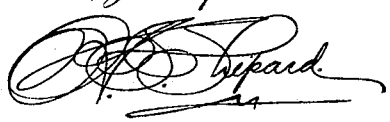
Witnesses
Frank G. Campbell
Michael Long, Inventor.
By his Attorneys,
C. A. Snow & Co.
THE NORRIS PETERS CO., PHOTO-LITHO., WASHINGTON, D. C.

UNITED STATES PATENT OFFICE.

MICHAEL LONG, OF TYRONE, PENNSYLVANIA.

SOFT-TREAD HORSESHOE.

SPECIFICATION forming part of Letters Patent No. 646,029, dated March 27, 1900.

Application filed December 23, 1899. Serial No. 741,459. (No model.)

*To all whom it may concern:*

Be it known that I, MICHAEL LONG, a citizen of the United States, residing at Tyrone, in the county of Blair and State of Pennsylvania, have invented a new and useful Horseshoe, of which the following is a specification.

This invention relates to horseshoes, and has for its object to provide a soft or elastic tread shoe, so as to cushion the step of the animal and prevent jarring and slipping thereof when traveling over hard roads or roads made slippery by snow or ice. It is, furthermore, designed to provide improved means for securing the cushioning device to the shoe, so as to protect the former and permit of its being conveniently replaced, and also to provide soft and hard tread portions, both of which are exposed for contact with the ground.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

In the drawings, Figure 1 is an inverted perspective view of a horseshoe constructed in accordance with the present invention. Fig. 2 is an enlarged transverse sectional view thereof. Fig. 3 is a detail perspective view of the shoe proper, the cushioning-strips being removed. Fig. 4 is an enlarged detail sectional view taken on the line $x$ $x$ of Fig. 1. Fig. 5 is an enlarged transverse sectional view taken on the line 5 5 of Fig. 1. Fig. 6 is an enlarged detail perspective view of the metallic toe-plate for securing the adjacent ends of the cushioning-strips. Figs. 7 and 8 are detail perspective views showing toe and heel calks mounted on the cushioning-strips.

Corresponding parts in the several figures of the drawings are designated by like characters of reference.

Referring to the accompanying drawings, 1 designates the metallic shoe proper, having a pendent flange 2 extending entirely around the outer edge thereof. The inner edge of the shoe is provided with a plurality of pendent lips or shoulders 3, which form, in conjunction with the flange 2, a gutter or groove in the shoe side. A plurality of openings or perforations 4 are formed in the body of the shoe for the reception of fastenings, whereby the shoe may be secured to the hoof of the animal in the common or ordinary manner.

Seated upon the under side of the shoe and between the flanges thereof are the opposite elastic-tread sections 5, each of which is formed by a single strip of soft rubber. At the heel of the shoe each rubber strip is held in place by means of a screw-threaded fastening 6, which passes through the strip and engages a screw-threaded perforation 7, formed in the shoe proper. The head of the fastening is received within a countersunk opening 8 formed in the under side of the rubber strip, so as to prevent contact of the head with the ground. Also a metallic washer 9 is received within the countersunk opening 8 and receives the wear of the head of the fastening.

As best shown in Figs. 2 and 4 of the drawings, the forward ends of the rubber strips 5 are separated by an interspace, and the upper sides of said ends are beveled downwardly and inwardly, as indicated at 10. Fitted against the beveled ends of the rubber strips is a metallic toe-plate 11, which overlaps the ends of the strips and is provided with the oppositely-beveled ends 12, fitting against the respective beveled ends of the strips, and thereby normally held out of contact with the shoe proper. At opposite ends of the toe-plate are screw-threaded fastenings 13, which pass through the plate and the respective rubber strips and engage screw-threaded openings 14, formed in the body-portion of the shoe, whereby the rubber strips are firmly held in place.

From the foregoing description it will be apparent that the rubber strips form soft or elastic tread portions which cushion the step of the animal and also prevent slipping of the shoe. As the greatest wear upon the shoe is at the toe thereof, the toe-plate 11 has been provided, so as to receive such wear, and thereby protect the rubber strips. By reference to Fig. 4 of the drawings it will be seen that the fastenings 13 pass loosely through the perforations in the toe-plate, so that the latter may have a slidable movement upon the fastenings, whereby a yielding tread is preserved throughout the length of the shoe. By this arrangement the quarter and heel portions of the tread are comparatively soft to prevent slipping of the shoe, while the toe portion thereof is hard, so as to receive the greatest wear, and at the same time is yieldingly supported, so as to prevent jarring of the animal.

As illustrated in Fig. 8 of the drawings, the flat toe-plate 11 may be removed and substituted by a similar plate having a sharp toe-calk 15, and in order to preserve a level tread for the shoe I also provide each heel portion thereof with a sharp heel-calk 16, as shown in Fig. 7. Each heel-calk is of substantially L shape, having the attaching-shank 17, which fits against the under side of the adjacent cushioning-strip 5 and is provided with a perforation adapted to register with the perforation in the strip, so that the common fastening 6 may secure both the calk and the cushioning-strip to the shoe. By this arrangement the shoe may be conveniently provided with sharp calks and at the same time the cushioning effect of the strip 5 is preserved.

What is claimed is—

1. A horseshoe, having opposite removable soft-tread portions, and a hard-tread portion overlapping the adjacent ends of the soft-tread portions, secured to the horseshoe, holding the soft-tread portions in place and cushioned thereby, and both tread portions being exposed for contact with the ground.

2. A horseshoe, having separate soft-tread portions fitted to opposite sides of the shoe, and a metallic toe-plate fitting against the opposite inner ends of the soft-tread portions, holding the latter in place and also cushioned thereby, and each tread portion being exposed for contact with the ground.

3. A horseshoe, having opposite soft-tread portions separated by an interspace at the toe of the shoe, and a metallic toe-plate fitting against the opposite inner ends of the soft-tread portions, spaced away from the shoe proper, and cushioned by the soft-tread portion.

4. A horseshoe, having separate soft and elastic strips secured to the under side of the shoe and separated by an interspace at the toe of the shoe, a metallic toe-plate fitted upon the adjacent ends of the elastic strips and spaced away from the shoe proper, and fastenings passing loosely through the toe-plate and fixedly engaging the shoe proper.

5. A horseshoe, comprising a metallic shoe proper, having outer and inner marginal flanges, soft elastic strips seated between the flanges and separated by an interspace at the toe of the shoe, countersunk fastenings securing the heel ends of the strips to the shoe, and the toe ends of the strips being beveled inwardly and downwardly, a metallic toe-plate having oppositely-beveled ends fitting against the beveled portions of the elastic strips, and fastenings passing loosely through the toe-plate and fixedly engaging the shoe proper.

6. A horseshoe, having opposite cushioning-strips separated by an interspace at the toe of the shoe, a metallic toe-plate fitting against the opposite inner ends of the strips, securing the latter in place, and provided with a sharp calk, and heel-calks fitting against the respective strips, and fastenings connecting the calks to the shoe and also common to the respective strips.

In testimony that I claim the foregoing as my own I have hereto affixed my signature in the presence of two witnesses.

MICHAEL LONG.

Witnesses:
C. A. ROBESON,
C. O. TEMPLETON.